Patented Sept. 8, 1925.

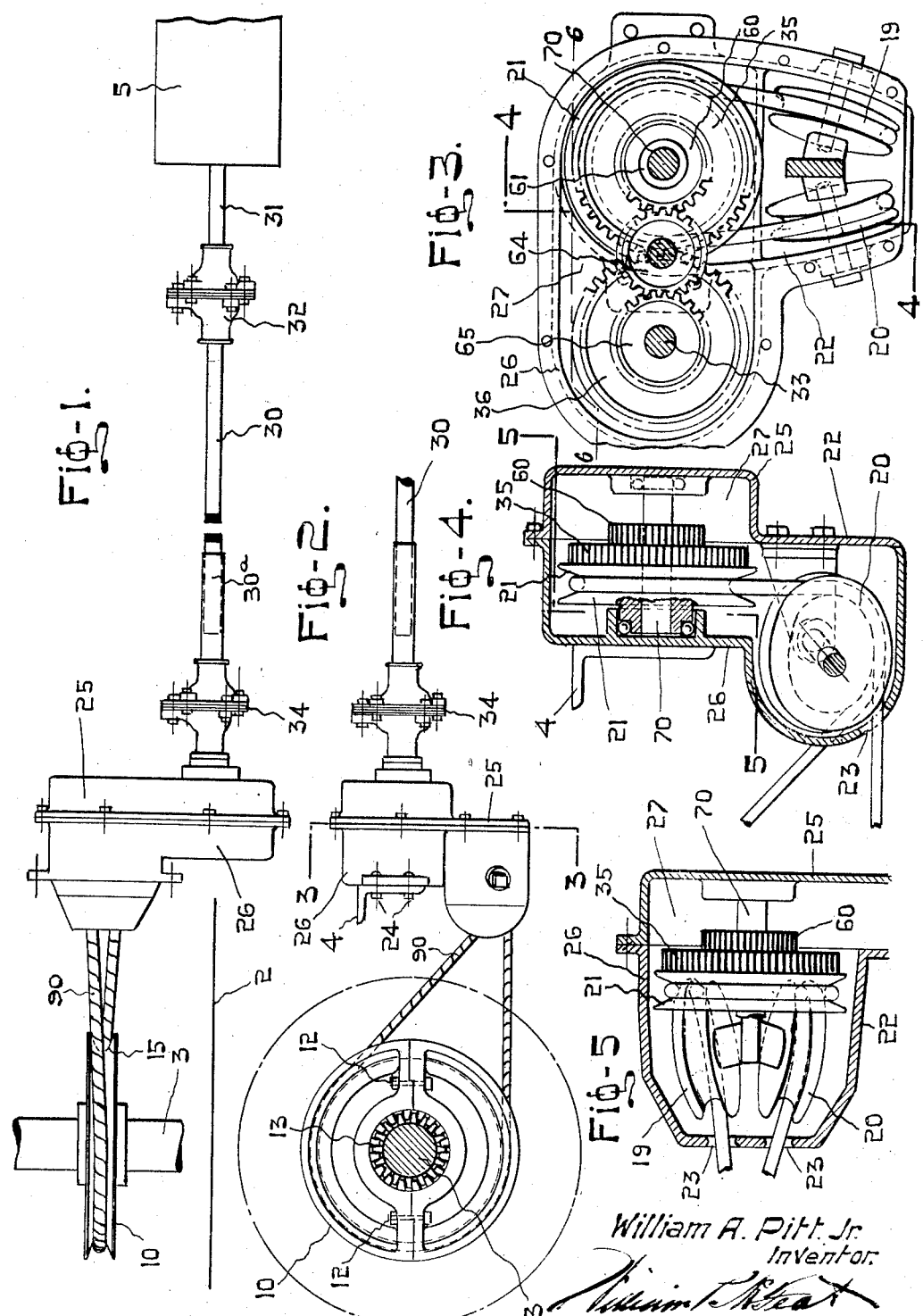

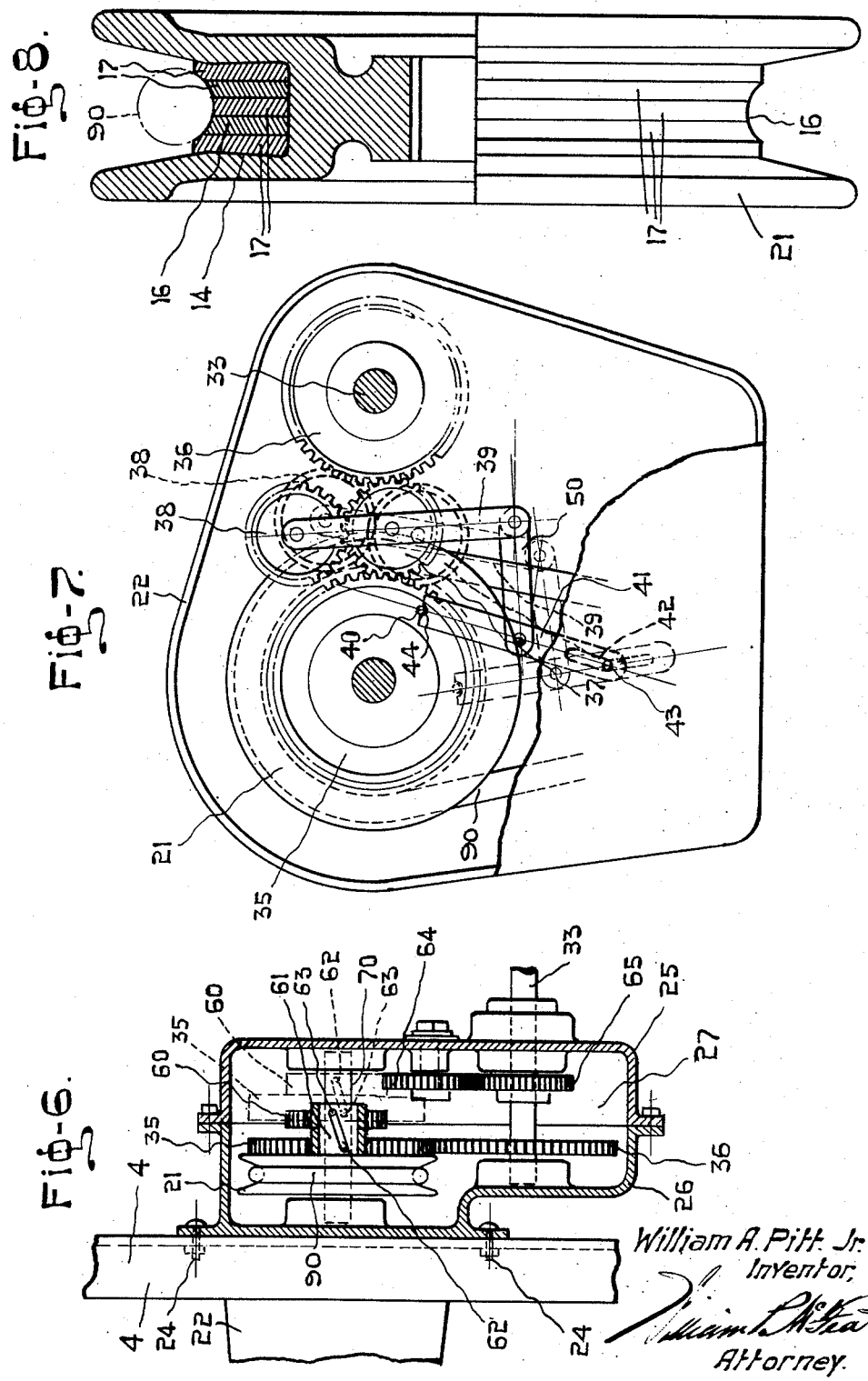

1,553,048

UNITED STATES PATENT OFFICE.

WILLIAM A. PITT, JR., OF MONTREAL, QUEBEC, CANADA, ASSIGNOR OF TWENTY PER CENT TO HIMSELF, SIXTY PER CENT TO WILLIAM A. PITT, SR., AND TWENTY PER CENT TO GEORGE F. SHEPPARD, ALL OF MONTREAL, CANADA.

TRANSMISSION GEAR.

Application filed January 25, 1923. Serial No. 614,935.

*To all whom it may concern:*

Be it known that I, WILLIAM A. PITT, Jr., of the city of Montreal, Province of Quebec, Dominion of Canada, a subject of the King of Great Britain, have invented certain new and useful Improvements in Transmission Gears; and I do hereby declare that the following is a full, clear, and exact description thereof.

My invention relates particularly to transmission gear for driving the generator of a railway car lighting system from one of the car axles.

Of the various drives of this type which have been put into service in the past that which has gone into most extensive use is what may be termed the "belt drive." This drive consists briefly stated of a driving sheave or pulley mounted upon one of the car axles, a driven sheave on the generator shaft, and a belt looped around both sheaves.

These drives have proved a source of constant expense to the railroads owing to the belts becoming displaced or broken when in service and having to be replaced. Repeated attempts have been made to overcome this difficulty by eliminating the belt but as yet none have been successful and the belt drive has proved the most economical notwithstanding the extra expense of the lost belts. The primary object of the present invention therefore is to provide a belt drive in which the possibility of accidental displacement of the belt from its sheaves and breakage of the belt is eliminated. A further object of the invention is to provide a construction which will prevent the accumulation of snow and ice on the belt which usually occurs during the winter months.

A further object is to provide a drive of this type by which the generator will be driven in one direction irrespective of the direction in which the car is travelling, thereby overcoming the necessity of using pole changers and avoiding the commutator troubles which are experienced when the direction of rotation of the generator armature is reversed.

A further object is to provide a construction and arrangement of the parts which will permit of the driving sheave being positioned on the car axle at any point substantially throughout the length of the latter thereby making it possible to mount the drive in a position on the car where it will least interfere with the other adjacent parts of the substructure.

A further object is to provide a construction in which the usual heavy wear and tear on the various parts will be greatly reduced and the cost of manufacture and maintenance of which will be much less than that of drives of this type now in use.

For full comprehension, however, of my invention, reference must be had to the accompanying drawings in which similar reference characters indicate the same parts, and wherein:

Figure 1 is a plan view of a transmission gear constructed according to my invention;

Figure 2 is a fragmentary side elevation thereof;

Figure 3 is a sectional view taken on line 3—3 Figure 2;

Figure 4 is a sectional view taken on line 4—4 Figure 3;

Figure 5 is a sectional view taken on line 5—5 Figure 4;

Figure 6 is a sectional view taken on line 6—6 Figure 3;

Figure 7 is a detail fragmentary elevation of a modification; and

Figure 8 is a detail elevation partly in section of one of the sheaves or pulleys.

Referring to the drawings the underside of a car body is indicated at 2, one of the car axles at 3, and a part of one of the trucks at 4.

The generator to be driven is indicated at 5 and is rigidly or flexibly mounted in position upon the underside of the car body with its armature and shaft disposed longitudinally relatively to the car. This position of the generator is unusual in drives employing a belt and sheave the usual position being with the generator shaft disposed parallel to the car axle, or in other words transversely to the length of the car. That the longitudinal position is the more advantageous is quite obvious as it provides a greater distance along the car axle within which the driving sheave may be positioned thereby making it possible in the initial assembling to mount the sheave in a position in which it will least interfere with other parts of the substructure.

My improved transmission gear broadly stated comprises a belt and sheave unit which is mounted upon the truck and is movable therewith relatively to the car body and a universal rotative connection between the unit and the generator which while transmitting power to the generator permits of the "play" therebetween which is constantly taking place when the car is in motion.

Referring to the belt and sheave unit, a driving sheave 10 constructed in two parts which are bolted together as at 12 is mounted in position encircling a resilient corrugated bushing 13 which in turn encircles the car axle 3. The periphery of the sheave is provided with a comparatively deep groove 14 to receive the endless belt 15. The latter is composed of a flat metal strip or strand of wire wound spirally forming a belt 90 of circular cross-section. A belt so constructed is much more efficient than the belt ordinarily used for the reason that it can be placed under heavy tension and will withstand expansion and contraction and its irregular or serrated exterior enables it to grip the sheaves with which it contacts and prevent slippage. In some types of drives for railway car lighting slippage of the belt after a given speed is exceeded, is necessary. Experience has shown, however, that with such drives the belt frequently slips when it should not and sufficient power is not generated. Of course even with the present construction a slight slippage will take place at times but this is negligible.

As a further precaution against slippage the bottom of the groove 14 is provided with a relatively soft seat 16 constituted by a leather or fibre insert 17, the irregular exterior of the belt forming corresponding irregularities in the seat as it contacts therewith establishing an intermeshing relation.

From the driving sheave the belt passes over one of a pair of idler sheaves 19 and 20 respectively to the driven sheave 21 and from the latter it returns over the other idler of the pair to the driving sheave. The three sheaves 19, 20 and 21 are contained within a housing 22, the idlers being positioned in the lower portion thereof and rotatable in anti-friction bearings upon axes disposed transversely to the axis of the shaft 70 of the driven sheave 21, the latter being disposed longitudinally of the car in position above the idlers. Each of these three last-mentioned sheaves is provided with a grooved periphery and seat similarly to the driving sheave, but the diameters of all three are smaller than that of the latter, the idlers being even smaller than the driven sheave and positioned with their lowermost portions in substantially horizontal alignment with the lowermost portion of the driving sheave. This arrangement causes the belt to travel in a substantially horizontal direction between the driving sheave and the idler 20, and at an angle of approximately 45°, being the driving sheave and the idler 19 while travel between the idlers and the driven sheave is in a vertical direction, thereby increasing the arc of contact of the belt on the driving and driven sheaves and preventing the accumulation of snow and ice which usually occurs during the winter months. The lower end of the housing 22 is provided with openings 23 through which the belt passes. This housing is rigidly secured upon the truck frame as at 24 although it may be flexibly supported if desired. It is constructed in two parts 25 and 26 which are bolted together forming a chamber 27 having an enlarged lower end to accommodate the idler sheaves.

It may also be found desirable to vary the tension of the belt. This may be done by adjustably mounting the housing on the truck frame or adjustably mounting the idlers with relation to the driven sheave. It will be seen from the foregoing description that the driven sheave 21 rotates on an axis immovable relatively to the driving sheave so that the possibility of the belt becoming displaced is eliminated.

The drive from the driven sheave to the generator consists of a telescopic shaft, the telescopic parts of which are indicated at 30 and 30ª and are of square cross-section and means for driving the generator in one direction irrespective of the direction of travel of the car. This shaft is disposed longitudinally of the car and rotatively connected at one end to the generator armature shaft 31 by a universal connection 32 and at its opposite end to a stub shaft 33 by a second universal connection 34.

The shaft 33 and the means for driving the generator in one direction are mounted in the housing 22 and such means may consist of either the mechanisms illustrated in Figures 3 to 6 inclusive or that illustrated in Figure 7. Referring to the drive illustrated in Figures 3 to 6 inclusive a gear 35 with a smaller gear 60 is rigidly mounted upon a bushing 61 which in turn encircles the shaft 70 adjacent the driven sheave and is provided with obliquely disposed slots 62 through which studs 63 rigidly carried by the shaft 70 project. This construction and arrangement of parts is adapted to cause axial movement of both gears 35 and 60 along the shaft 70 when the direction of rotation of the latter is reversed as would happen if the car were moved in the opposite direction. At one end of its axial travel the gear 35 is adapted to intermesh with a gear 36 keyed upon shaft 33 and at the opposite end of such travel the gear 60 is adapted to intermesh with an idler 64 which in turn intermeshes with the gear 65 keyed on shaft 33. Assuming the shaft 70 is rotating in a counter clockwise direction the load on the bushing 61 will tend to retard the same, and owing to the oblique arrangement of the slots 62 will move the bushing and with it gears 35 and 60 axially until the studs 63 reach the end of their slots, this movement positioning gear 35 in position intermeshing with gear 36 and consequently rotating the latter in a clockwise direction. When the direction of travel of the car is reversed and shaft 70 rotated in a clockwise direction the bushing is moved axially in the opposite direction until the studs reach the opposite end of their slots. In this latter position the gear 60 intermeshes with idler 64 so that the shaft 33 is driven in a clockwise direction.

The drive illustrated in Figure 7 consists of a gear 35 carried by and rotatable in unison with the driven sheave 21 a second gear 36 keyed upon the shaft 33; a pair of idler gears 37 and 38 supported by an arm 39 in position between the gears 35 and 36, and means for automatically controlling such arm whereby it is caused to assume a position with the idler 37 in direct intermeshing relation with the gears 35 and 36 when the gear 35 is rotating in a clockwise direction looking towards the generator and whereby when the direction of rotation of the gear 35 is reversed the idler 37 will be moved out of intermeshing relation with the gear 36 while the idler 38 is moved into position intermeshing with the gear 36. The two idlers are in constant intermeshing relation and consequently in this latter position the drive takes place successively through gear 35, idler 37, idler 38 and gear 36, and consequently the latter is driven in a clockwise direction notwithstanding the fact that the gear 35 is rotating in a counter clockwise direction. The means which automatically moves the idlers in and out of intermeshing relation with gear 35 consists of a stud 40 projecting from the side of the gear 35; an arm 41 having a slot 42 at its lower end to receive a pin 43 upon which it swings, the upper end of the arm being notched as at 44 and adapted to intersect the path of the stud 40 when the direction of rotation of the gear 35 is reversed. When this intersection takes place the stud upon engaging the notched end of the arm exerts a downward thrust upon the latter and causes it to be swung to position indicated in dotted lines in Figure 7.

This movement is transmitted to arm 39 through a link 50 which connects the former with the arm 41.

Although it has been found preferable to mount the generator upon the underside of the car body it is to be distinctly understood that it may be mounted upon the truck if desired without departing from the spirit of the invention.

What I claim is as follows:—

1. The combination with a railway car truck and a transmission unit mounted thereon, said unit consisting of a driving sheave mounted upon and rotatable in unison with the axle, a driven sheave rotatable on an axis immovable relatively to the axle, a pair of idler sheaves, and a belt successively contacting with the driving sheave, one of the idler sheaves, the driven sheave, the other idler sheave and back to the driving sheave.

2. In a railway car the combination with the body thereof and one of the trucks including an axle; of a generator mounted upon the underside of the body, a driving sheave mounted upon and rotatable in unison with the axle, a driven sheave mounted upon the truck and rotatable on an axis extending at right angles to the said axle and immovable relatively to the axle, a belt looped around the sheaves, and means effecting a rotative connection between the driven sheave and generator, said means including a universal connection permitting relative movement between the driven sheave and generator.

3. In a railway car the combination with the body thereof and one of the trucks including an axle, of a generator, a driving sheave rigidly mounted upon and rotatable in unison with the axle, a driven sheave, a belt looped around the sheaves, and means effecting a rotative connection between the driven sheave and generator and adapted to automatically drive the generator in one direction irrespective of changes in the direction of rotation of the driven sheave.

4. In a railway car the combination with the body thereof and one of the trucks including an axle, of a generator, a driving sheave mounted upon and rotatable in unison with the axle, a driven sheave mounted upon the truck and rotatable on an axis immovable relatively to the axle, a belt looped around the sheaves, and means effecting a rotative connection between the driven sheave and generator and adapted to drive the generator in one direction irrespective of changes in the direction of rotation of the driven sheave.

5. In a railway car having a car body and a truck supporting the body and including a frame and axle, a generator, a driving sheave mounted upon and rotatable in unison with the axle, a driven sheave rotatively connected to the generator and rotatable on an axis longitudinally of the car, a pair of idler sheaves rotatable on axes disposed transversely to the length of the car, and a belt successively contacting with the driving sheave, one of the idler sheaves, the driven sheave, the other idler sheave and back to the driving sheave.

6. In a railway car a truck including one of the axles, a transmission unit mounted upon the truck and consisting of a driving sheave mounted upon and rotatable in unison with the axle, a driven sheave rotatable on an axis disposed longitudinally of the car, a pair of idler sheaves and a belt successively contacting with the driving sheave, one of the idler sheaves, the driven sheave, the other idler sheave and back to the driving sheave.

7. In a railway car having a car body and a truck supporting the body and including a frame and axle; a generator rigidly mounted upon the underside of the body, a driving sheave encircling the axle and rotatable therewith, a housing mounted upon the truck frame, a driven sheave mounted within the housing and rotatable on an axis disposed longitudinally of the car, a pair of idler sheaves mounted within the housing and rotatable on axes disposed transversely to the length of the car, a belt successively contacting with the driving sheave, one of the idler sheaves, the driven sheave, the other idler sheave and back to the driving sheave, a shaft disposed longitudinally of the car and rotatably connected to the driven sheave at one end and to the generator at its opposite end.

8. In a railway car having a car body and a truck supporting the body and including an axle; a generator rigidly mounted upon the underside of the body with its armature disposed longitudinally of the car, a driving sheave encircling the axle and rotatable therewith, a driven sheave rotatable on an axis disposed longitudinally of the car, a pair of idler sheaves rotatable on axes disposed transversely of the length of the car, a belt successively contacting with the driving sheave, one of the idler sheaves, the driven sheave, the other idler sheave, and back to the driving sheave, a shaft disposed longitudinally of the car and rotatably connected to the driven sheave at one end and to the generator at the opposite end.

9. In a railway car truck including one of the axles, a transmission unit consisting of a driving sheave mounted upon and rotatable with the axle, a driven sheave rotatable upon an axis disposed longitudinally of the car, a pair of idler sheaves rotatable on axes disposed transversely to the length of the car, and a belt successively contacting with the driving sheave, one of the idler sheaves, the driven sheave, the other idler sheave and back to the driving sheave said belt consisting of a plurality of spirally wound wire strands.

10. In a railway car the combination with the body thereof and one of the tracks including an axle, a driving sheave mounted upon and rotatable in unison with the axle, a driven sheave mounted upon the truck and rotatable on an axis immovable relatively to the axle, a belt looped around the sheaves, a generator and means effecting a rotative connection between the driven sheave and generator and adapted to drive the generator in one direction irrespective of changes in the direction of rotation of the driven sheave, said means consisting of a gear rotatable in unison with the driven sheave, a second gear located adjacent the first-mentioned gear and rotatively connected to the generator, a train of gears adapted to effect a rotative connection between the said first and second gears, the said train being adapted to assume positions in which the second gear is driven in the same direction irrespective of the direction of first gear, and means for automatically shifting the train when the direction of rotation of the driven sheave is changed.

11. In a railway car having a car body, a truck supporting the body and including a frame and axle; a generator rigidly mounted upon the underside of the body with its armature disposed longitudinally of the car, a bushing encircling the axle, a driving sheave composed of two parts clamped together in position encircling the bushing and rotatable with the axle, the periphery of said sheave being grooved throughout its length and the bottom of the groove being constituted by a leather seat, a housing rigidly mounted upon the truck frame, a shaft rotatably mounted within the housing and disposed horizontally and longitudinally of the car, a driven sheave keyed upon said shaft and having a grooved periphery, a pair of idler sheaves mounted within said housing adjacent the driven sheave, and adapted to rotate on axes disposed transversely to the length of the car, said last-mentioned sheaves having grooved peripheries, a metallic belt successively contacting with the driving sheave, one of the idler sheaves, the driven sheave, the other idler sheave and back to the driving sheave, a second shaft disposed longitudinally of the car, a universal connection between one end of the second shaft and the armature of the generator, and a universal connection between the opposite end of the second shaft and the shaft of the driven sheave.

12. In a railway car the combination with the body thereof and one of the trucks including an axle, a driving sheave mounted upon and rotatable in unison with the axle, a driven sheave mounted upon the truck and rotatable on an axis immovable relatively to the axle, a belt looped around the sheaves, and means effecting a rotative connection between the driven sheave and generator and adapted to drive the generator in one direction irrespective of changes in the direction of rotation of the driven sheave, said means consisting of a shaft rotatably connected to the driven sheave, an axially movable sleeve loosely encircling said shaft and having a diagonally disposed slot therein, a stud rigidly mounted upon the shaft and projecting through the slot, a pair of gears keyed upon said bushing, a second shaft, a pair of gears keyed upon said second shaft, an idler gear intermeshing with one of said gears of the last-mentioned pair and adapted to effect a rotative connection therebetween and one of the gears of the first-mentioned pair when the sleeve is at one end of its axial travel, the other gears of the pairs being adapted to intermesh directly with each other when the sleeve is at the opposite end of its axial travel.

13. In a railway car having a car body, a truck supporting the body and including a frame and axle; a generator rigidly mounted upon the underside of the body with its armature disposed longitudinally of the car, a bushing encircling the axle, a driving sheave composed of two parts clamped together in position encircling the bushing and rotatable with the axle, the periphery of said sheave being grooved throughout its length and the bottom of the groove being constituted by a leather seat, a housing rigidly mounted upon the truck frame, a shaft rotatably mounted within the housing and disposed horizontally and longitudinally of the car, a driven sheave keyed upon said shaft and having a grooved periphery, a pair of idler sheaves, a metallic belt successively contacting with the driving sheave, one of the idler sheaves, the driven sheave, the other idler sheave and back to the driving sheave, and a second shaft disposed longitudinally of the car and effecting a rotative connection between the driven sheave and generator, said second shaft consisting of a plurality of shaft parts in telescopic relation with each other.

14. In a railway car having a car body, a truck supporting the body and including a frame and axle; a generator rigidly mounted upon the underside of the body with its armature disposed longitudinally of the car, a bushing encircling the axle, a driving sheave composed of two parts clamped together in position encircling the bushing and rotatable with the axle, the periphery of said sheave being grooved throughout its length and the bottom of the groove being constituted by a leather seat, a housing rigidly mounted upon the truck frame, a shaft rotatably mounted within the housing and disposed horizontally and longitudinally of the car, a driven sheave keyed upon said shaft and having a grooved periphery; a pair of idler sheaves, a metallic belt successively contacting with the driving sheave, one of the idler sheaves, the driven sheave, the other idler sheave and back to the driving sheave, and a second shaft disposed longitudinally of the car and effecting a rotative connection between the driven sheave and generator, said second shaft consisting of a plurality of shaft parts in telescopic relation with each other, a universal connection between one end of said second shaft and the driven sheave and between the opposite end of the second shaft and the armature of the generator.

In testimony whereof I have signed my name to this specification.

WILLIAM A. PITT, Jr.